United States Patent

[11] 3,579,067

| [72] | Inventor | William C. Riester<br>Williamsville, N.Y. |
|---|---|---|
| [21] | Appl. No. | 759,839 |
| [22] | Filed | Sept. 16, 1968 |
| [45] | Patented | May 18, 1971 |
| [73] | Assignee | Trico Products Corporation<br>Buffalo, N.Y. |

[54] MOTOR CONTROL SYSTEM
8 Claims, 4 Drawing Figs.

[52] U.S. Cl. .................................. 318/444,
318/379
[51] Int. Cl. ..................................... H02p 1/04
[50] Field of Search .......................... 318/269,
375, 379, 443, 444

[56] References Cited
UNITED STATES PATENTS
| 3,189,811 | 6/1965 | King | 318/269 |
| 3,219,901 | 11/1965 | Foreman | 318/443 |

Primary Examiner—Oris L. Rader
Assistant Examiner—Thomas Langer
Attorney—E. Herbert Liss ABSTRACT: An electric motor-driven windshield wiper system for producing timed dwell periods between cycles of wiper operation incorporating a first silicon-controlled rectifier triggered by a timing network which includes a unijunction transistor which is in turn triggered by an RC circuit. A cyclically actuated switch responsive to motor rotation moves between a running and parking contact. When on the running contact a rectifier is connected in circuit with the motor-energizing circuit and also bypasses the silicon-controlled rectifier thus extinguishing it. A dynamic braking circuit is provided which includes a second silicon-controlled rectifier triggered by charging current of a capacitor in the gate circuit when the cyclically actuated switch moves from the running contact to the parking contact. When the cyclical switch moves to the run position the motor continues to be energized through the rectifier until the cyclic switch reaches the park position thereby triggering the second silicon-controlled rectifier in the dynamic braking circuit.

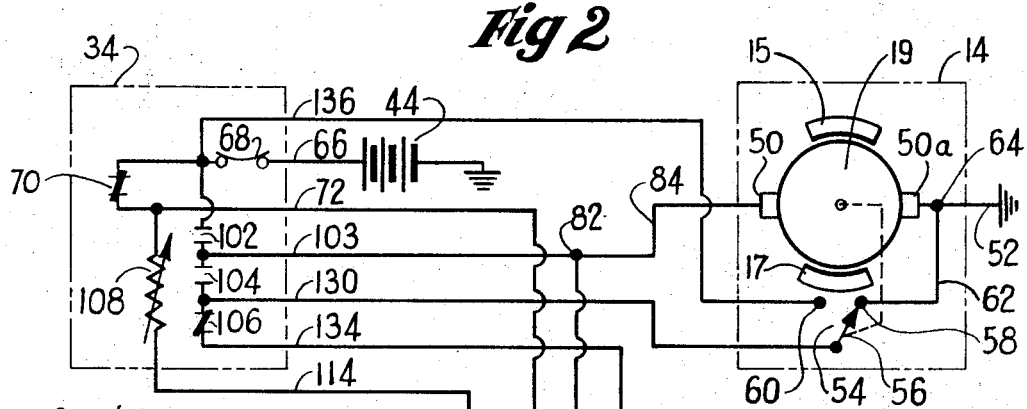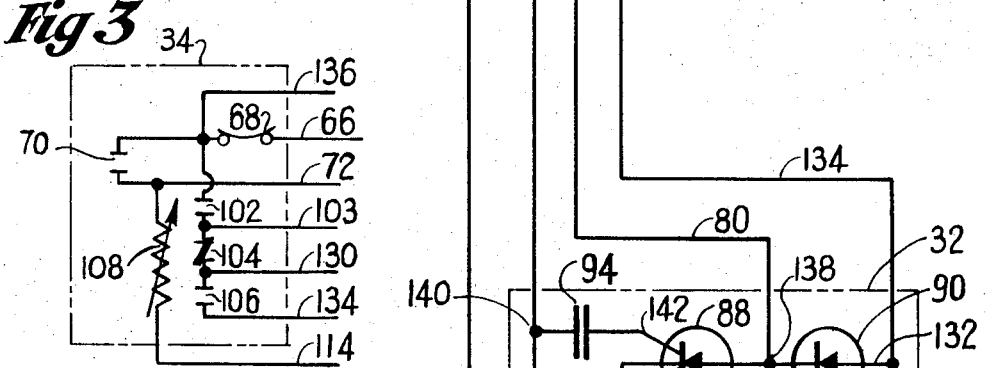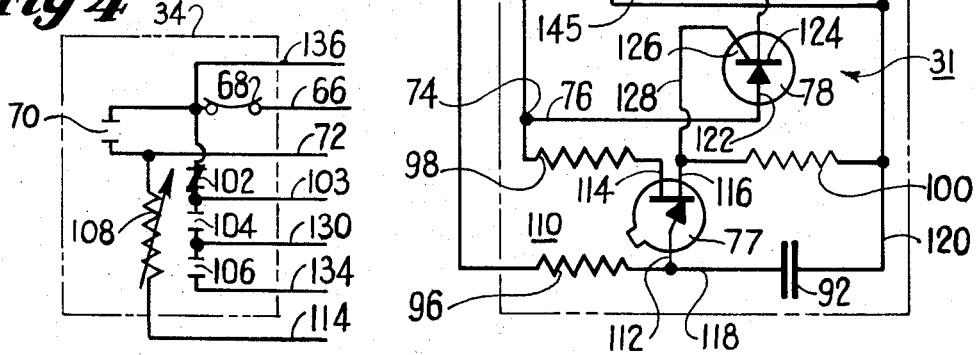

3,579,067

MOTOR CONTROL SYSTEM

BACKGROUND OF THE INVENTION

The invention relates to control systems for producing intermittent dwell motor operation and, more particularly, to a windshield wiper control system for producing intermittent dwell windshield wiper operation.

Known intermittent dwell wiper systems comprising solid-state components utilize relays which are bulky. Because of the cyclical nature of an intermittent dwell wiper system the movable contacts of a relay are subjected to a high frequency of opening and closing. This, as well as ambient contaminates, causes failure, unreliability and short life of the relay. British Pat. No. 1,017,400 filed Sept. 3, 1964, corresponding to U.S. application Ser. No. 317,628 filed Oct. 21, 1963 (now abandoned) discloses a complete solid-state system provided with means for dynamic braking of the motor; however, a relatively large resistor (1 ohm) is incorporated in the dynamic braking system to limit short circuit current during the starting and running period of the motor. This heavy resistance attenuates the braking effect resulting in substantial coasting of the motor. It also dissipates substantial heat and places heavy current across the solid-state components. Due to this current a large quantity of heat is dissipated in the solid-state components, materially reducing their life. Further large heat sinks and expensive high rating components are required.

SUMMARY

A control system for a motor utilizing solid state electronic components in the timing energizing and dynamic braking system is provided which eliminates relays and other devices having movable components.

The present invention employs a silicon-controlled rectifier operating as a switch is the dynamic braking circuit. Improved braking is achieved because the silicon-controlled rectifier in the conducting state offers negligible ohms's resistance in the forward direction. When the wiper motor is energized the silicon-controlled rectifier is extinguished. Thus the dynamic braking circuit becomes effectively an open circuit. Rapid, heat free braking of the motor is achieved.

Another feature of the invention is the unique use of a diode rectifier in cooperation with a silicon-controlled rectifier in the energizing circuit of the motor. When a motor-operated cyclic parking switch moves to the running position the diode serves to bypass and extinguish the silicon-controlled rectifier in the energizing circuit of the motor. The wiper motor is then energized through the rectifier. This latter silicon-controlled rectifier is triggered by a timing network to initiate the wiping cycle when the cyclically operated switch is in the parked position to produce intermittent dwell operation.

The principle object of the present invention is to provide an improved control system for a dynamoelectric machine which employs solid-state components to effect controlled dwell periods between cycles of wiper operation, which utilizes a minimum number of components and is economically feasible for large production commercial applications.

Another object of the invention is to provide an improved control system for a dynamoelectric machine which employs solid-state components to effect-controlled dwell periods between cycles of operation and to provide dynamic braking of the motor preceding a dwell period.

A further and more specific object of the invention is to provide an improved windshield wiper control system for a direct current windshield wiper motor utilizing solid-state components for providing controlled dwell periods between cycles of wiper operation and for providing dynamic braking preceding each dwell period which is compact, utilizes a minimum number of components and is economically feasible for commercial use.

Other objects and advantages of the invention will be apparent from the following detailed description taken in connection with the accompanying drawings.

BRIEF DESCRIPTION OF THE DRAWINGS

FIG. 2 is a circuit diagram of the control system of this invention.

FIGS. 3 and 4 are diagrammatic representations of the manual switch for the control system in "park" and "continuous run" positions, respectively.

DESCRIPTION OF THE PREFERRED EMBODIMENT

Figure 1:
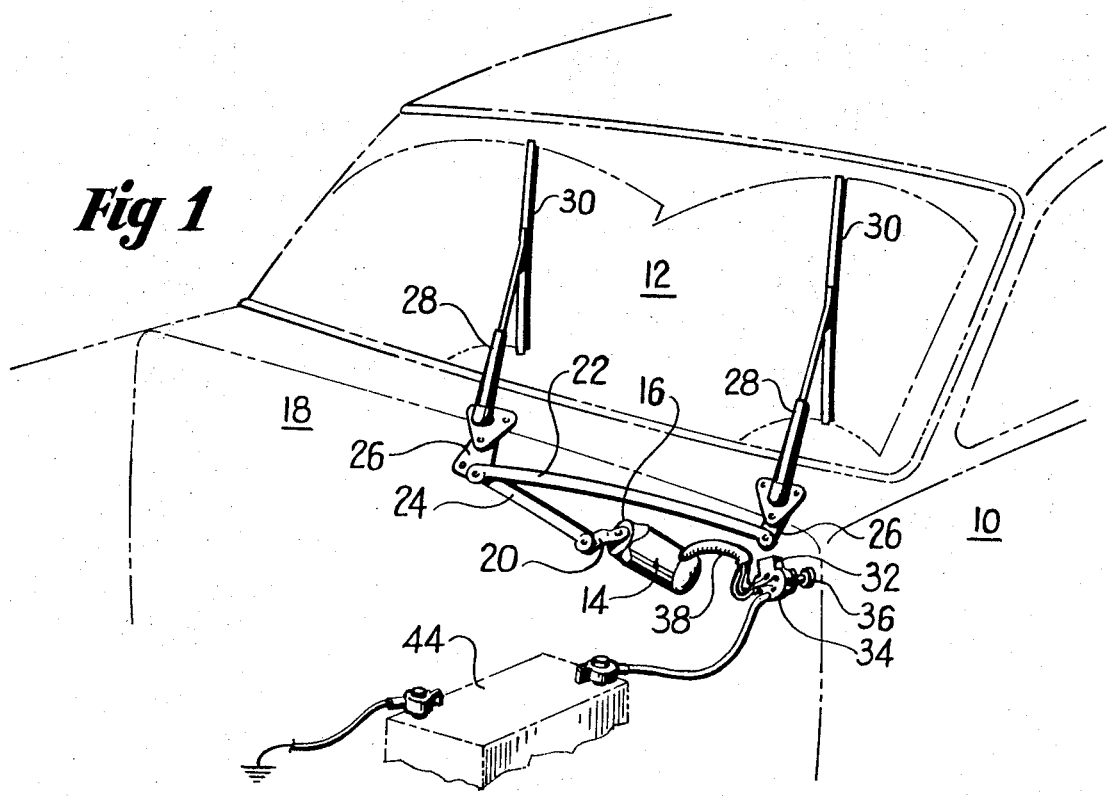
FIG. 1 is a partial perspective view of a vehicle incorporating the invention.

In FIG. 1 an automotive vehicle 10 is shown having a windshield 12 mounted thereon in a conventional manner. The windshield wiper motor 14 and gear reduction unit 16 are mounted on the firewall 18 of the vehicle. The gear reduction unit has a crank arm 20 operatively coupled thereto. An elongated link 22 is pivotally secured to the crank arm 20 through a second elongated link 24. Opposite ends of the link 22 are connected to the crank arms 26 mounted at the inner ends of rock shafts or pivot shafts (not shown) which pivot shafts are journaled in the cowl of the vehicle and have wiper arms 28 mounted at their outer ends. The wiper arms each carry wiper blades 30. The wiper motor 14 has field magnets 15 and 17 and an armature 19 which is connected by linkages 20, 22, and 24 to drive wiper blades 30. When the wiper motor 14 is energized the wiper blades 30 are oscillated across the windshield to clear moisture therefrom.

A control housing 32 containing the components of the control circuit shown in FIG. 2 may be mounted on the inner side of the dash panel of the vehicle. A manual switch 34 having a control shaft and knob 36 is mounted at the housing; the control shaft 36 extends through the dash and is positioned for convenient manipulation by the driver. A harness 38 of electrical conductors extends between the control housing 32 and the motor 14 to connect the control system to the wiper motor. The vehicle is provided with a battery 44 which serves as a power supply. The negative terminal of the battery 44 may be grounded to a common ground system.

In FIG. 2 there is shown a circuit diagram of a windshield wiper illustrating a preferred embodiment of the invention. The motor 14 illustrated by way of example, is a permanent magnet type direct current motor having a pair of brushes 50 and 50a being connected to ground through a lead 52. It will of course be understood that other and different types of direct current dynamoelectric machines may be employed in accordance with the broader aspects of the invention. A cyclically actuated parking switch 54 is associated with the motor and is responsive to motor rotation. Any suitable means such as a cam and cam follower on the motor shaft or linkage may be employed to operate the switch 54. It includes a movable contact 56 movable from a contact 58 for energizing a parking circuit to a contact 60 for energizing a running circuit.

A manual switch 34 including contact pairs 70, 102, 104 and 106 is shown diagrammatically in the intermittent dwell position in FIG. 2, in the park position in FIG. 3, and in the continuous run position in FIG. 4. In the continuous run position only contacts 102 are closed. The motor may be energized from the positive terminal of battery 44 through circuit breaker 68, contacts 102, lead 103, junction 82, lead 84, brush 50, armature 19, brush 50a, junction 64, lead 52 to ground.

To discontinue operation the manual switch 34 is moved to the park position. Contacts 104 are closed and contacts 102 are opened (FIG. 3). The motor continues to operate from battery 44 through circuit breaker 68, lead 136, contacts 56 and 60, lead 130, closed contactor 104, lead 103, junction 82 and lead 84 and through brushes 50, 50a and motor armature 19 to ground until the movable contactor 54 moves to engage parking contact 58. When this occurs a circuit is established through the parking contact 58 and contactor 56 of the cyclically actuated switch 54 to conduct regenerative current from the motor through brush 50a, junction 64, contacts 58 and 56, lead 130, contacts 104, lead 103, junction 82, lead 84 to brush 50 whereby dynamically braking the motor.

In the intermittent dwell position contacts 70 and 106 are closed while contacts 102 and 104 are open. In this position the control shaft assembly 36 may be manipulated by the operator to vary the effective resistance of the potentiometer 108. The intermittent dwell control system 31 contained in housing 32 comprises a unijunction transistor 77, a first silicon-controlled rectifier 78 utilized as a first semiconductor switch, a second silicon-controlled rectifier 88, utilized as a second semiconductor switch, a diode 90, and capacitors 92 and 94. Also in the control system are resistors 96, 98 and 100, and a potentiometer or variable resistance 108 included in the manual switch.

The timing network 110 includes the unijunction transistor 77 having an emitter 112 and base terminals 114 and 116, the potentiometer 108, capacitor 92 and resistors 96, 98 and 100. The potentiometer 108 is connected through the resistor 96 and the lead 114 to the emitter terminal 112 of the unijunction transistor 77 and also to one terminal of the capacitor 92 through a lead 118. The other side of the capacitor 92 is connected through a lead 120 and resistor 100 to base terminal 116 of the unijunction transistor 77. The base terminal 114 of the unijunction transistor 77 is connected to the anode 122, of a first silicon-controlled rectifier 78 through resistor 98, junction 74 and lead 76. The silicon-controlled rectifier 78 includes the anode 122, a cathode 124, and a gate 126. The base 116 of the unijunction transistor is connected to the gate 126 of the silicon-controlled rectifier 78 through a lead 128. The cathode 124 of the silicon-controlled rectifier 78 is connected through a lead 80, junction 82 and lead 84 to the brush 50 of the motor.

When the motor is in park position with the movable contact 56 of the cyclically actuated switch 54 in engagement with terminal 58 and the manual switch 34 is placed in the intermittent dwell position (FIG. 2) the timing network 110 is energized from the positive terminal of the battery 44 through lead 66, circuit breaker 68, closed contacts 70, potentiometer 108, lead 114, resistor 96, capacitor 92, lead 120, closed contacts 106 and switch 34, lead 130, movable contact 56 of switch 54, fixed contact 58, lead 62, junction 64 and ground. The capacitor then charges at a rate determined by the setting of the potentiometer 108. When it reaches a critical voltage the capacitor discharges through resistor 100, base terminal 116 of the unijunction transistor 77 and the emitter 112. The unijunction transistor conducts thereby triggering the silicon-controlled rectifier 78.

When the silicon-controlled rectifier 78 is placed in a conducting state in this manner the motor is energized from the positive terminal 44 through lead 66, circuit breaker 68, closed contact 70, conductor 72, junction 74, conductor 76, silicon-controlled rectifier 78, lead 80, junction 82, lead 84. Brush 50a is permanently connected to ground. As the motor begins to rotate cyclically actuated switch 54 moves from its first position. Movable contact 56 leaves parking contact 58, deenergizing the parking circuit, and moves to contact 60 thereby energizing the running circuit.

The cyclically actuated switch is thus in its second position. When this occurs rectifier 90 is connected in a circuit parallel to the silicon-controlled rectifier 78 because the terminal 60 of switch 54 is connected directly to the positive terminal of the battery. Thus the anode 132 of rectifier 90 becomes connected to the positive terminal of the battery through lead 134, closed contacts 106, lead 130, movable contact 56 of cyclic switch 54, contact 60, lead 136, circuit breaker 68 and lead 66. The cathode being connected at junction 138 to the cathode of silicon-controlled rectifier 78 thus places the two components in parallel. The relationship between the forward resistance of diode 90 and the cutoff current of silicon-controlled rectifier 78 is such as to cause diode 90 to bypass and extinguish silicon-controlled rectifier 78. As the same time the motor continues to be energized through the rectifier 90 by way of conductor 80, junction 82 and lead 84 to the brush. It should be noted that when the cyclically actuated switch 54 moves to its second or run position, capacitor 92 in the timing network 110 is short circuited through a path of negligible resistance. Therefore during each cycle capacitor 92 is substantially fully discharged thereby assuring a constant dwell period at a fixed setting of the potentiometer 108.

When the movable contact 56 of switch 54 returns to the contact 58, its first position, closing the parking circuit, voltage is established across capacitor 94 and gate-to-cathode circuit of silicon-controlled rectifier 88. The charging current flows to the capacitor 94 from the positive terminal of the battery 44, circuit breaker 68, closed contact 70, lead 72, junction 140, to one plate of the capacitor 94. The other plate of the capacitor 94 is connected to ground through the gate 142 of the second silicon-controlled rectifier 88 and the cathode terminal 145 of the silicon-controlled rectifier 88, lead 144, junction 146, lead 134, closed contacts 106 of the manual switch 34, lead 130, movable contact 56 of the cyclical switch 54, lead 62, junction 64 to ground. The charging current flowing to the capacitor triggers the silicon-controlled rectifier 88 which becomes conductive and provides a dynamic braking circuit for the motor. The regenerative current of the motor flows from brush 50 to brush 50a through conductor 84, junction 82, conductor 80, junction 138, silicon-controlled rectifier 88, lead 144, junction 146, lead 134, closed contact 106, lead 130 through the parking switch 54 to brush 50a.

When contactor 56 of cyclical switch 54 leaves the "run" position at contact 60 and before it reaches the "park" position at contact 58 the energizing circuit for the motor is open, thus eliminating the possibility of the motor being energized when the dynamic braking circuit is activated.

The motor now stops precisely in a selected position to effect parking of the wiper blades in a selected position. The second silicon-controlled rectifier 88 is extinguished when the motor stops rotating. In this condition the timing circuit 110 is reenergized. After a duration of time controlled by the setting of the potentiometer the first silicon-controlled rectifier is again triggered and the cycle repeats itself until the operator chooses to discontinue wiper operation by moving the switch shaft 36 to park position at which time the entire circuit shuts down.

A certain specific embodiment of the invention has been described for the purpose of illustration but it will be apparent that various modifications and other embodiments are possible within the scope of the invention. For example, in accordance with the broader aspects of the invention, any suitable type of motor such as a shunt, a series or a compound wound DC motor may be employed. The control system is disclosed for use with a windshield wiper system but may be employed as well for controlling a motor which drives other and different mechanisms where intermittent dwell operation or precise braking positions are desirable. It is to be understood, therefore, that the invention is not limited to the specific arrangement shown but in its broadest aspects it includes all equivalent embodiments and modifications which come within the scope of the invention.

I claim:

1. In a windshield wiper control system including an electrical motor operable to oscillate the wiper and to park the wiper in a predetermined position, an electric energy source, a timing network, an energizing network connecting said motor to said energy source, a dynamic braking circuit for said motor and a cyclically actuated switch actuatable in response to motor rotation from a first position having closed contact in circuit with said dynamic braking circuit and said timing network, to a second position having closed contacts in circuit with said motor and said energizing source to form a running circuit bypassing said energizing network for energizing said running circuit, first semiconductor switch means in said energizing network for controlling energization of said motor when the cyclically actuated switch is in said first position wherein the improvement comprises second semiconductor switch means in circuit with said dynamic braking circuit when said cyclically actuated switch returns to said first position, pulse-producing means for triggering said second semiconductor switch means when said cyclically actuated switch moves from said second position to said first position said timing network being in circuit with said first semiconductor switch means for triggering said first semiconductor switch means in a time interval following movement of said cyclically actuated switch to said first position to effect a single cycle of wiper motor operation with a time interval between successive cycles of wiper motor operation.

2. In a windshield wiper control system including an electrical motor operable to oscillate the wiper and to park the wiper in a predetermined position, an electric energy source, a timing network, an energizing network connecting said motor to said energy source, a dynamic braking circuit for said motor and a cyclically actuated switch actuable in response to motor rotation from a first position having closed contact in circuit with said dynamic braking circuit and said timing network, to a second position having closed contacts in circuit with said motor and said energizing source to form a running circuit bypassing said energizing network for energizing said running circuit, first semiconductor switch means in said energizing network for controlling energization of said motor when the cyclically actuated switch is in said first position, wherein the improvement comprises means in circuit with said cyclically actuated switch for bypassing and extinguishing said first semiconductor switch means when said cyclically actuated switch moves to said second position, second semiconductor switch means in circuit with said dynamic braking circuit when said cyclically actuated switch returns to said first position, pulse-producing means for triggering said second semiconductor switch means when said cyclically actuated switch moves from said second position to said first position, said timing network being in circuit with said first semiconductor switch means for triggering said first semiconductor switch means at delayed time intervals to effect a single cycle of wiper motor operation with a time interval between successive cycles of wiper motor operation.

3. The combination according to claim 2 wherein the means for bypassing and extinguishing said first semiconductor switch means includes rectifier means connected in said energizing circuit in parallel with said first semiconductor switch means when said cyclically actuated switch is in said second position whereby said first semiconductor switch means is rendered nonconducting and said motor is energized through said rectifier.

4. A combination according to any of claims 1, 2 or 3 wherein said timing network includes a manually adjustable element for controlling the duration of the time interval between successive cycles of motor operation.

5. A combination according to any of claims 1 to 3 wherein said first semiconductor switch means comprises a first silicon-controlled rectifier.

6. A combination according to any one of claims 1 to 3 wherein said second semiconductor switch means comprises a second silicon-controlled rectifier.

7. A combination according to claim 6 wherein said pulse-producing means comprises a capacitor in series with the gate-to-cathode circuit of said second silicon-controlled rectifier being connected across said power source when said cyclically actuated switch moves from said second position to said first position.

8. In combination a direct current motor having an armature rotatable within a magnetic field, current collectors in contact with said armature, a source of DC power, an energizing circuit for said motor including a dynamic braking circuit bridging said current collectors, an energizing network connecting said motor to said source and a running circuit bypassing said energizing network, first switch means in circuit with said dynamic braking circuit and second switch means in circuit with said running circuit, a timing network for activating said energizing network in a delayed time interval after closing said first switch means, said dynamic braking circuit comprising semiconductor switch means connected in circuit with said current collectors, pulse-producing means for triggering said second semiconductor switch when said second switch means is open and said first switch means is closed, said semiconductor switch means being extinguished when the regenerative current from said armature drops below the cutoff current value of said semiconductor switch means whereby said circuit comprising said collectors and said second semiconductor switch means is in a nonconducting state when said armature member is energized and is in a conducting state when said armature is deenergized and producing sufficient regenerative current, said first and second switch means being elements of a cyclically actuated switch actuatable in response to motor rotation from a first position for energizing said dynamic braking circuit to a second position for energizing said running circuit and wherein a silicon-controlled rectifier is provided in said energizing network for controlling the energization of said motor when the cyclically actuated switch is in said first position, means for energizing said motor when said cyclically actuated switch is in said second position and said timing network triggering said first semiconductor switch means at delayed time intervals to effect a single cycle of wiper motor operation with a time interval between successive cycles of wiper motor operation.

UNITED STATES PATENT OFFICE
CERTIFICATE OF CORRECTION

Patent No. 3,579,067　　　　　　　　Dated May 18, 1971

Inventor(s) William C. Riester

It is certified that error appears in the above-identified patent and that said Letters Patent are hereby corrected as shown below:

Column 6, line 27, change "said second semiconductor" to --said semiconductor--; line 43, change "position, means" to --position, circuit means parallel to said silicon-controlled rectifier--; lines 45-46, change "first semiconductor switch means" to --silicon-controlled rectifier--.

Signed and sealed this 15th day of August 1972.

(SEAL)
Attest:

EDWARD M. FLETCHER, JR.　　　　　　　ROBERT GOTTSCHALK
Attesting Officer　　　　　　　　　　Commissioner of Patents